(12) United States Patent
Testroet

(10) Patent No.: US 6,702,467 B2
(45) Date of Patent: Mar. 9, 2004

(54) RUBBER BEARING FOR CHASSIS PARTS IN MOTOR VEHICLES

(75) Inventor: Martin Testroet, St. Augustin (DE)

(73) Assignee: ZF Boge GmbH, Bonn (DE)

( * ) Notice: Subject to any disclaimer, the term of this patent is extended or adjusted under 35 U.S.C. 154(b) by 24 days.

(21) Appl. No.: 10/108,408

(22) Filed: Mar. 28, 2002

(65) Prior Publication Data

US 2002/0141669 A1 Oct. 3, 2002

(30) Foreign Application Priority Data

Mar. 30, 2001 (DE) .......................... 101 16 053

(51) Int. Cl.⁷ .............................................. F16C 27/06
(52) U.S. Cl. ...................................... 384/222; 384/275
(58) Field of Search ................................. 384/215, 220, 384/221, 222; 267/141, 141.1, 141.2, 141.3, 292, 293

(56) References Cited

U.S. PATENT DOCUMENTS

| | | | | |
|---|---|---|---|---|
| 2,608,751 A | * | 9/1952 | Hutton ........................ | 384/222 |
| 2,851,314 A | * | 9/1958 | Thomson .................... | 384/222 |
| 3,383,143 A | * | 5/1968 | Schmidt ...................... | 384/215 |
| 5,143,457 A | * | 9/1992 | Langhof et al. ............ | 384/276 |
| 5,328,160 A | * | 7/1994 | McLaughlin ............. | 267/141.3 |
| 5,593,233 A | | 1/1997 | Kammel et al. ............ | 384/222 |
| 5,820,115 A | * | 10/1998 | Stevenson et al. .......... | 267/293 |

* cited by examiner

Primary Examiner—Thomas R. Hannon
(74) Attorney, Agent, or Firm—Cohen, Pontani, Lieberman & Pavane

(57) ABSTRACT

Rubber bearing for chassis parts in motor vehicles includes an inner tube which can be installed in a first chassis part, a concentrically arranged intermediate part which is slideably rotatable on said inner tube, an elastomeric body which surrounds and tightly adheres to the intermediate part and which can be installed in a second chassis part. The intermediate part which is fixedly connected with the elastomer body is provided with a sliding coat on its inner circumferential surface.

16 Claims, 5 Drawing Sheets

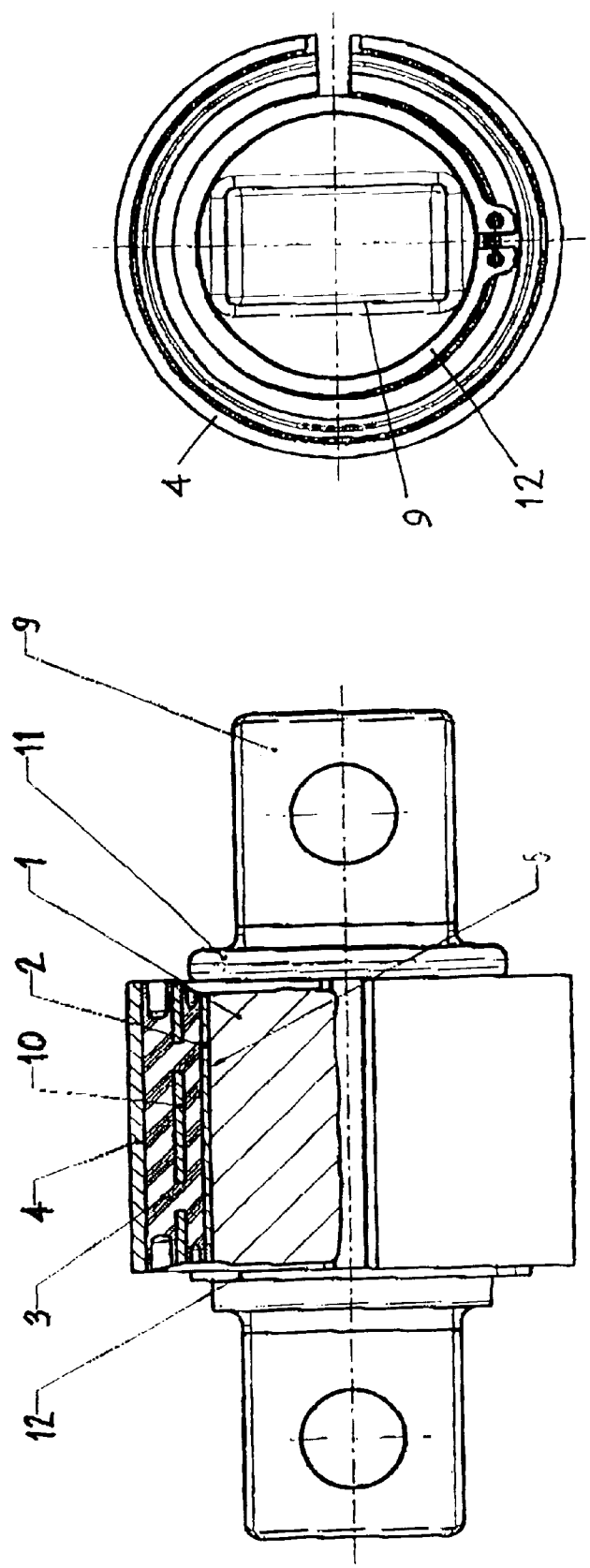

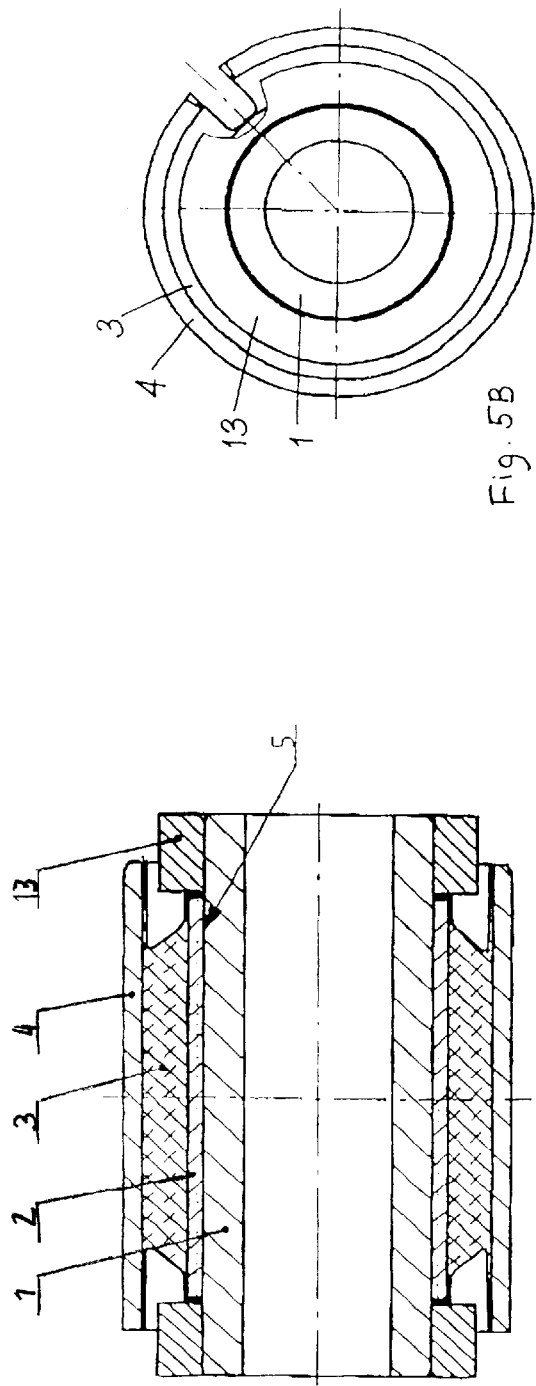

RUBBER BEARING FOR CHASSIS PARTS IN MOTOR VEHICLES

BACKGROUND OF THE INVENTION

1. Field of the Invention

The invention is directed to a rubber bearing for chassis parts in motor vehicles comprising an inner tube which can be installed in a first vehicle part, a concentrically arranged intermediate part which is rotatable so as to slide on the first vehicle part, an elastomer body which surrounds the intermediate part so as to adhere tightly to it and which can be installed in a second vehicle part and, if required, enclosed by an outer tube.

2. Description of the Related Art

U.S. Pat. No. 5,593,233 discloses a rubber bearing for chassis parts in which the elastomer body is fastened to an outer tube and, in addition, a slide bushing made of a material having good sliding properties is received between the outer tube and the inner tube. The outer circumference of the elastomer body can be provided with another outer tube. It is disadvantageous in this arrangement that the many individual parts necessitate time-consuming assembly in order to ready the entire rubber bearing for installation. Moreover, due to the multiplicity of parts on the radial inner side of the elastomer body, it has turned out that in certain cases the required properties of durability can hardly be achieved or are difficult to achieve.

SUMMARY OF THE INVENTION

It is the object of the invention to provide a maintenance-free, flexible bearing for chassis applications which is virtually free from aligning torque or restoring moment, particularly for shock absorbers, spring struts, links of all kinds, leaf spring eyes or stabilizer eyes, and which is quiet and enables large twisting or turning angles. Further, durability properties should be able to be achieved.

According to the invention, this object is met by providing the intermediate part which is fixedly connected with the elastomer body with a sliding coat on its inner circumferential surface.

It is advantageous in this embodiment form that the intermediate part is connected with the elastomer body in a tightly adhering manner. This intermediate part comprises a metallic carrier with a fixedly adhering sliding coat at the inner circumferential surface. The actual material of the intermediate part is preferably produced from sheet steel, so that a surface treatment for the subsequent vulcanizing process, e.g., zinc coating, chrome coating or zinc/nickel coating with chromating, can be produced without a time-consuming covering of the inner sliding coat for pretreatment by sandblasting.

The sliding coat preferably comprises a PTFE compound material.

According to another essential embodiment form, the intermediate part is constructed as a rolled bushing and advantageously has a gap along its axial length. It is advantageous that the intermediate part is constructed in the form of a rolled bushing such that the longitudinal side is provided with a roll gap, so that a slight pretensioning can be produced when inserting the inner tube through the intermediate part in order to achieve safe transport. In this situation, the roll gap opens slightly. However, during operation of the rubber bearing the breakaway torque is very low during turning movement, so that a turning movement over 360° can be achieved without a substantial restoring moment.

During vulcanization, the gap is pressed closed by means of tool-related precautions and suitable pressing down at the end faces of the rolled bushing such that no rubber runs over into the component part, so that the sliding coat arranged at the inner circumference is not influenced and manufacturing expenditure need not be excessive.

According to another essential feature, the outer circumferential surface of the inner tube is provided with a sliding coat.

In another advantageous arrangement, the intermediate part is fitted to the inner tube with radial pretensioning. It is advantageous that the pretensioning provides for a fit of the bearing without play and with low friction so that it is self-adjusting and possible unevenness or tolerances in the inner tube due to wear or overcoming by the pretensioning of the rolled bushing readjusts automatically and accordingly remains free from play and wear.

Further, it is provided that the elastomer body or the outer tube surrounding the elastomer body is received in the second vehicle part with radial pretensioning. The outer tube advantageously has an axially extending longitudinal gap.

In this embodiment form, it is advantageous that pretensioning is applied to the rubber bearing by mounting the entire bearing element in a second vehicle part. This has a positive effect on the life of the rubber bearing.

A rubber bearing of the type mentioned above can be used, for example, as an articulated bearing in a vibration damper, which drastically reduces the stress on the piston rod by the articulated bearing with low restoring moment. The diameters of the piston rods can accordingly be reduced or the adjoining structural component parts can have correspondingly smaller dimensions. On the other hand, durability can be increased with installation space remaining the same.

Assembly is simplified and facilitated as a whole because the rubber bearing can be produced as a permanent constructional unit. Further, the rubber bearing improves chassis comfort in motor vehicles because the elastic bearing which is free from restoring moment provides for better response of the individual chassis components so that, in turn, positive influences can be achieved for safety and driving dynamics. In this respect, it is especially advantageous when a rubber bearing of this type is used in highly practical, intelligent chassis components such as a variably adjustable vibration damper component.

Preferred embodiment examples of the invention are shown schematically in the drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3A is a partial cross-section of a third embodiment;

FIG. 3B is a end view of the third embodiment;

FIG. 5A is a cross section of a fifth embodiment;

FIG. 5B is an end view of the fifth embodiment; and

FIG. 5C is a partial cross-section of the fifth embodiment as installed

DETAILED DESCRIPTION OF THE PRESENTLY PREFERRED EMBODIMENTS

Figure 1B:
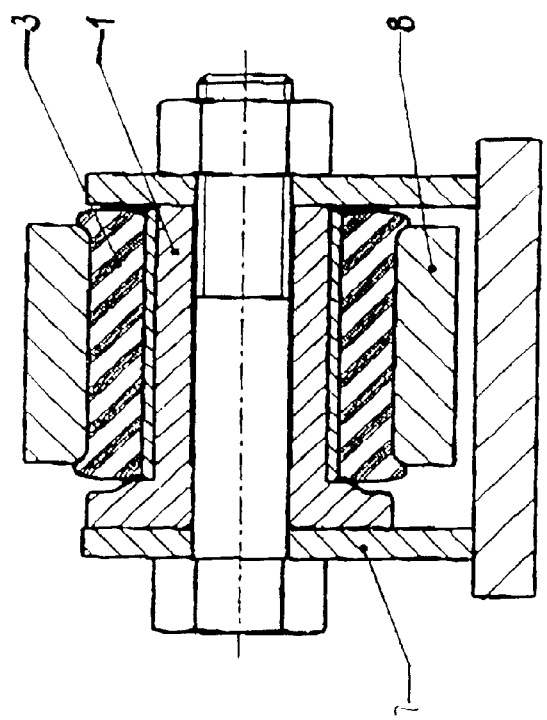
FIG. 1B is a cross-section of the bearing installed between two vehicle parts.
Figure 1A:
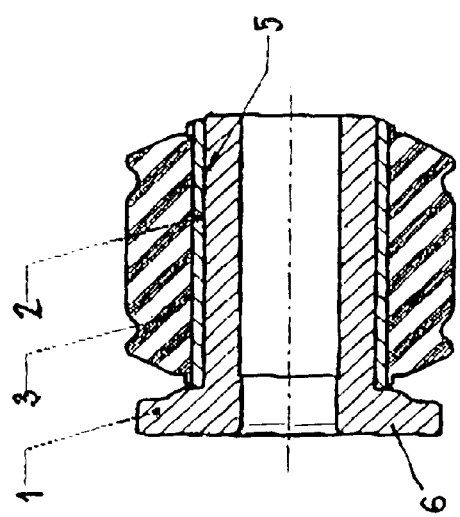
FIG. 1A is a cross-section of the rubber bearing according to the invention.

FIGS. 1A to 1B show a rubber bearing in which the inner tube 1 is enclosed by an intermediate tube 2 which is fixedly connected to the elastomer body 3. The sliding coat 5 is provided on the inner circumferential surface of the intermediate part 2. This rubber bearing is provided on one side with a radial shoulder 6 which serves as a stop for axial movements in the installed state. FIG. 1B shows the installed state in which the inner tube 1 is connected to a first vehicle part 7, while the elastomer body 3 is received directly in a receiving bore hole of a second vehicle part 8.

Figure 2B:
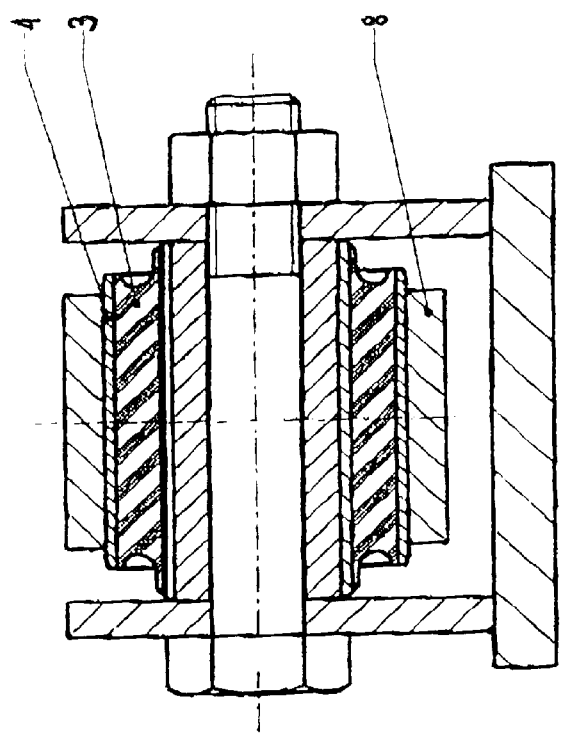
FIG. 2B is a cross-section of the second embodiment as installed.
Figure 2A:
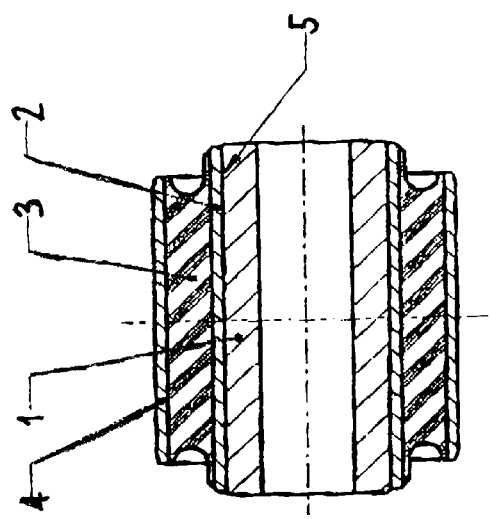
FIG. 2A is a cross-section of a second embodiment.

The rubber bearing shown in FIG. 2A comprises the inner tube 1 and the coating 5 which is arranged at the inner circumference of the intermediate part 2. The elastomer body 3 is enclosed coaxially by an outer tube 4. In the installed state according to FIG. 2B, the outer tube 4 is arranged in a receiving bore hole of a second vehicle part 8 by reducing the outer diameter. This increases the pretensioning in the elastomer body 3 and the durability of the rubber bearing as a whole. By using the sliding coat 5 at the inner circumference of the intermediate part 2 or at the outer circumference of the inner tube 1, it is ensured that the elastomer body 3 rotates relative to the inner tube 1 without a restoring moment.

FIGS. 3A and 3B shows a rubber bearing in which the inner part 1 is provided with fastening elements 9. The intermediate part 2 is arranged on this inner part 1, and the elastomer body 3 is enclosed coaxially by an outer tube 4 and is strengthened by a metal reinforcement 10. The inner part 1 is provided with a flange 11 and with a retaining ring clip 12 in order to secure it axially. In this way, the outer tube 4 together with the intermediate part 2 and the elastomer body 3 is additionally secured axially in a corresponding manner. The intermediate part 2, elastomer body 3, and outer tube 4 all have gaps which are radially aligned.

Figure 4B:
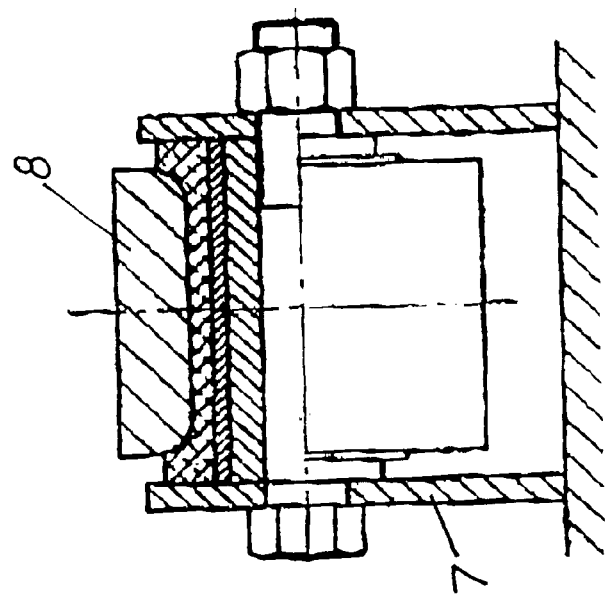
FIG. 4B is a partial cross-section of the fourth embodiment as installed.
Figure 4A:
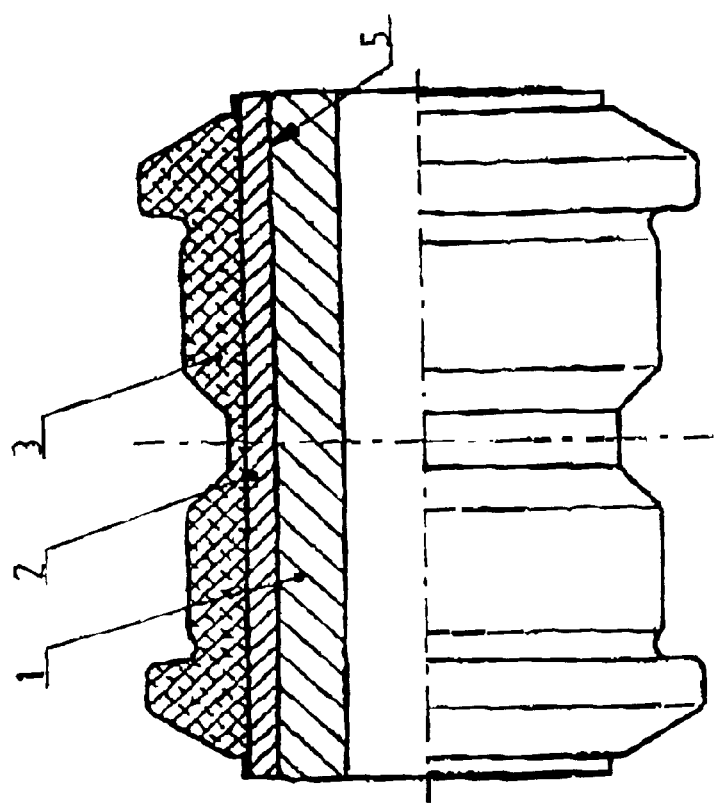
FIG. 4A is a partial cross-section of a fourth embodiment.

Another installation variant is shown in FIGS. 4A and 4B. In this case, the intermediate tube 2 is again arranged on the inner tube 1, while the elastomer body 3 is provided with a profiled outer circumferential surface. The intermediate part 2 again provides the sliding coat 5. FIG. 4B shows the corresponding installed state of this rubber bearing.

FIGS. 5A and 5B show another embodiment form in which the intermediate part 2 is arranged on the inner tube 1 together with the elastomer body 3. The sliding coat 5 is located on the inner circumference of the intermediate part 2, while the inner tube 1 is provided with a supporting ring 13 which is constructed as a radial stop and universal-type stop relative to the outer tube 4. FIG. 5C shows the associated installation situation, in which the outer tube 4 is received in a second vehicle part 8, while the inner tube 1 is fastened to the first vehicle part 7 via a pin 14.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A rubber bearing for supporting a first chassis part with respect to a second chassis part in a motor vehicle, said bearing comprising an inner tube which can be fixed to a first chassis part, said inner tube having an outer circumferential surface, an intermediate part concentrically arranged on said inner tube and having an inner circumferential surface, said intermediate part being a rolled bushing having an axial length with a gap along said length, said intermediate part being slideably rotatable on said inner tube, a sliding coating provided on at least one of said outer circumferential surface and said inner circumferential surface, and an elastomeric body which surrounds and tightly adheres to said intermediate part, said elastomeric body being installable in a second chassis part.

2. A rubber bearing as in claim 1 wherein said sliding coating is provided on the inner circumferential surface of said intermediate tube.

3. A rubber bearing as in claim 2 wherein said sliding coating is PTFE.

4. A rubber bearing as in claim 1 wherein said sliding coating is provided on the outer circumferential surface of said inner tube.

5. A rubber bearing as in claim 1 wherein said intermediate part is fitted to the inner tube with radial pretensioning.

6. A rubber bearing as in claim 1 wherein said elastomeric body is fitted into said second chassis part with radial pretensioning.

7. A rubber bearing as in claim 1 further comprising an outer tube surrounding said elastomeric body.

8. A rubber bearing as in claim 7 wherein said outer tube is fitted into said second chassis part with radial pretensioning.

9. A rubber bearing as in claim 7 wherein said outer tube has a an axial length with a gap along said axial length.

10. A rubber bearing as in claim 9 wherein said elastomeric body has a gap which is aligned with said gap in said intermediate sleeve and with said gap in said outer sleeve.

11. A rubber bearing as in claim 1 wherein said elastomeric body has a gap which is aligned with said gap in said intermediate sleeve.

12. A rubber bearing as in claim 1 wherein said rolled bushing is made from sheet steel.

13. A rubber bearing as in claim 12 wherein said rolled bushing has an outer circumferential surface which is surface treated for adhering said elastomeric body by vulcanizing.

14. A rubber bearing as in claim 13 wherein said outer circumferential surface comprises one of a zinc coating, a chrome coating, and a zinc/nickel coating with chromating.

15. A rubber bearing as in claim 13 wherein said inner circumferential surface is provided with said sliding coating.

16. A rubber bearing as in claim 15 wherein said sliding coating is PTFE.

* * * * *